No. 801,451. PATENTED OCT. 10, 1905.
G. FOUILLARON.
CHAIN BELT.
APPLICATION FILED JUNE 21, 1904.
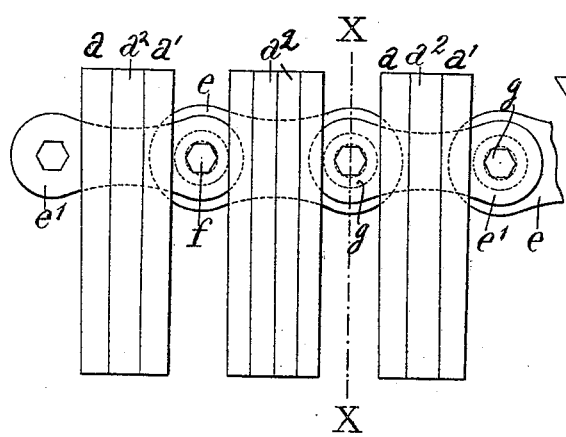
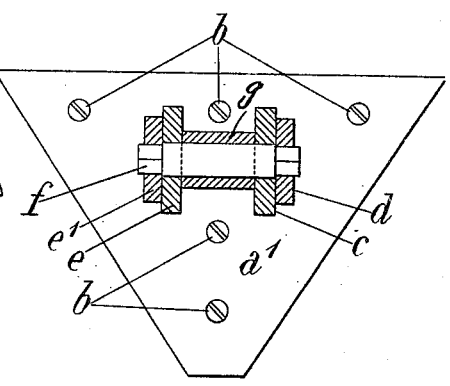
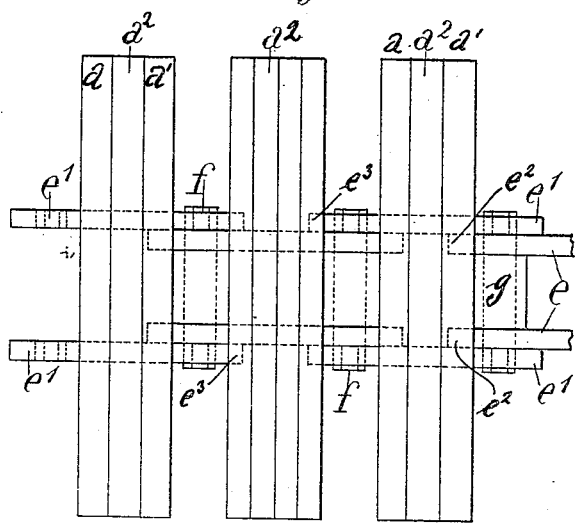

UNITED STATES PATENT OFFICE.

GUSTAVE FOUILLARON, OF LEVALLOIS-PERRET, FRANCE.

CHAIN BELT.

No. 801,451.  Specification of Letters Patent.  Patented Oct. 10, 1905.

Application filed June 21, 1904. Serial No. 213,537.

*To all whom it may concern:*

Be it known that I, GUSTAVE FOUILLARON, a citizen of the French Republic, and a resident of 54 Rue de Villiers of Levallois-Perret, Seine, France, have invented certain new and useful Improvements in and Connected with Chain Belts, of which the following is a specification.

This invention refers to a chain belt especially designed for the transmission of the rotary movement by extensile pulleys with angular grooves, thus permitting of a progressive change of speed. This belt can be made from leather waste or other suitable material used in the manufacture of belts and engages uniformly on both sides of the groove of the pulley, exerting sufficient pressure to prevent any slipping of the belt. It is of simpler construction than belts of a similar kind joined together by lacing, iron wire, or other means. The exact length of belt required is easily obtained, while at the same time it gives sufficient play so that the belt can adapt itself to the relatively small diameters of the pulleys.

I will now describe my invention with reference to the accompanying drawings, in which—

Figure 1 is an elevation of parts of a chain belt constructed according to my invention. Fig. 2 is a section of Fig. 1 on the line X X. Fig. 3 is a plan view of Fig. 1.

This belt consists of triangular blocks and of a chain composed of sheet-metal links $e\ e'$, being connected crosswise by sleeves $g$ or rollers, through which the bolts $f$ are passed in the well-known manner, receiving at the outer ends the eyes of the outer links $e'$, riveted or secured therein in any suitable manner. Each link $e\ e'$ is fitted in a triangular block formed of several small leather pieces $a'\ a^2$ joined together, preferably by means of rivets $b\ b$. To this end the leather blocks are provided with slots $c\ d$ for the passage of the links $e$ or $e'$, and they are cut so as to form an angle slightly more obtuse than the angle formed by the groove of the pulley. The outer leather pieces $a\ a'$ of the blocks are also provided with grooves or depressions $e^2\ e^3$ to receive the rounded ends of the adjacent links, as shown. The distance between the blocks is determined by the thickness of the cross-sleeves $g$, surrounding each bolt or pivot $f$. This separation must be such that when the belt is applied to the pulley the triangular blocks touch each other at their base. This base is intentionally blunted or cut off, so as to permit the belt to obtain a grip in the groove of the pulley.

Having now described my invention, I claim—

An improved belt composed of a chain made up of two rows of sheet-metal links $e\ e'$ in the well-known manner, having sleeves $g$ between their eyes at their ends as a cross connection, surrounding the bolt or pivot $f$, and of triangular blocks formed of several small pieces of leather $a\ a^2\ a'$, riveted together, said blocks being provided with suitable slots $c$ and $d$ for the passage of the metal links $e$ and $e'$ and with grooves or depressions $e^2\ e^3$ in the lateral faces of the outer leather pieces $a\ a'$ for the rounded ends of the adjacent links, substantially as described.

In testimony whereof I have hereunto set my hand in presence of two subscribing witnesses.

GUSTAVE FOUILLARON.

Witnesses:
JEAN BONNICART,
HANSON C. COXE.